Dec. 12, 1967     A. SALZER     3,357,897
WATER PURIFICATION APPARATUS
Filed Sept. 23, 1965     2 Sheets-Sheet 1
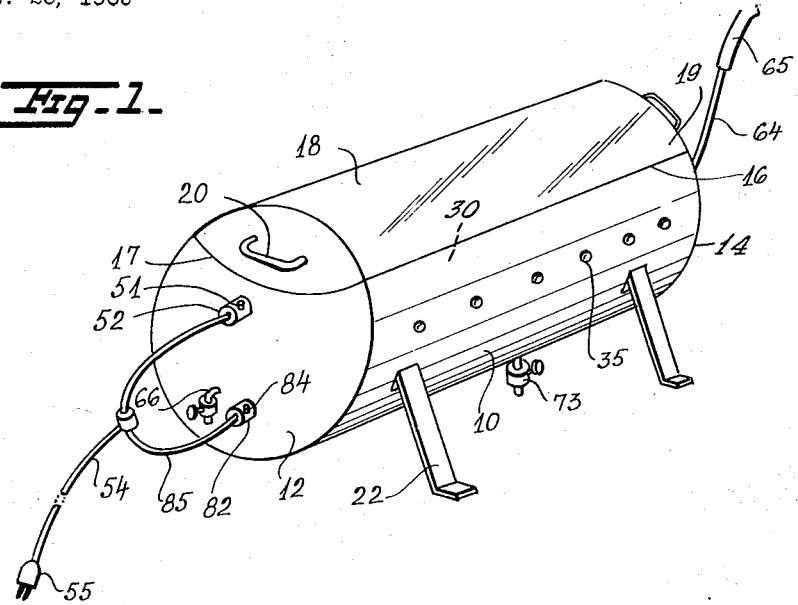
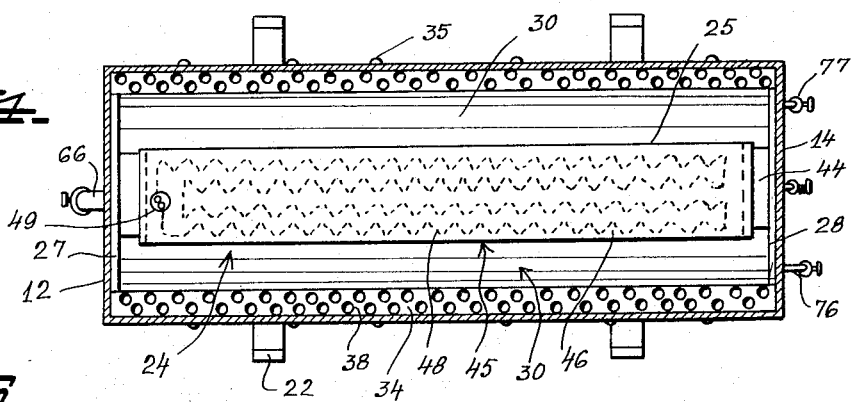
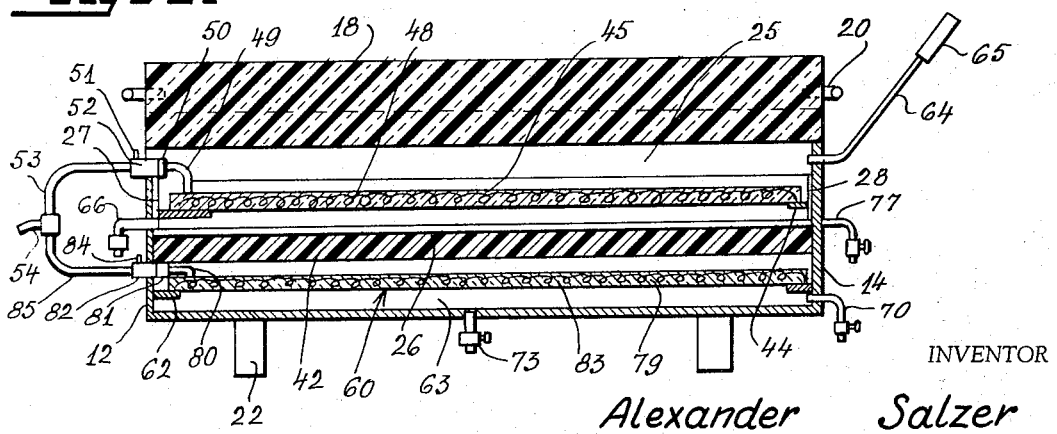
INVENTOR
Alexander Salzer
BY Polachek & Saulsbury
ATTORNEYS

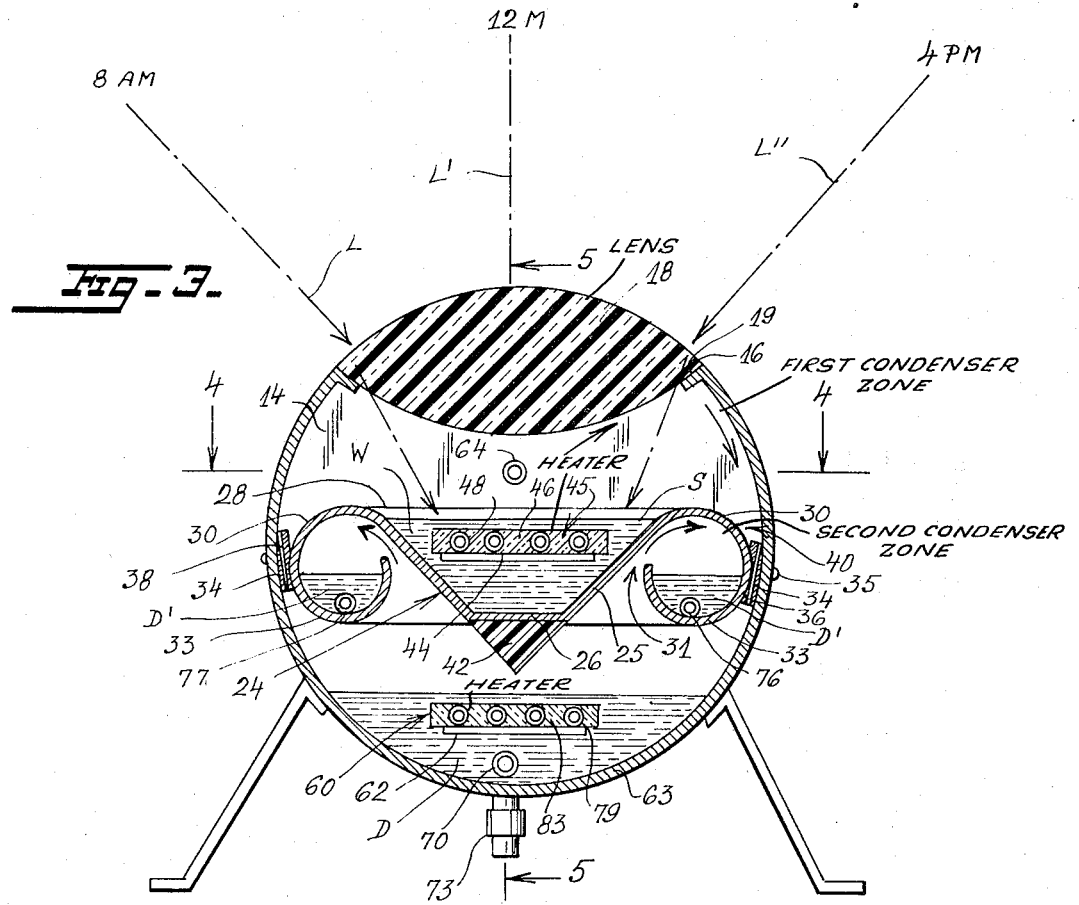

United States Patent Office 3,357,897
Patented Dec. 12, 1967

3,357,897
WATER PURIFICATION APPARATUS
Alexander Salzer, 157 E. 2nd St.,
New York, N.Y. 10002
Filed Sept. 23, 1965, Ser. No. 489,609
1 Claim. (Cl. 202—174)

ABSTRACT OF THE DISCLOSURE

Water purification apparatus having an elongated casing closed at the bottom and ends and provided with an elongated cylindrical double convex cylindrical removable lens in the open top end for passing solar rays into the casing for heating water therein. The bottom of the casing has a trough to collect water evaporated from the container and condensing as a distillate on interior walls of the casing. A first heater is provided in the casing for heating water therein to supplement heating of the nonpotable water by the solar rays. A second heater is provided for heating and evaporating the said distillate whereby the nonpotable water is doubly distilled, and a faucet is provided to drain off the waste from the casing.

---

This invention relates to the art of water purification apparatus and more particularly concerns a solar type of still adapted for double distillation of nonpotable water to produce pure water therefrom.

According to the invention the apparatus is provided with optical means for concentrating the sun's rays upon the surface of sea water or brackish in a pan. The water is heated by the sun's rays upon these surfaces and evaporates. The water vapor condenses on the walls of the apparatus and drains into a trough from which it can be drawn off. If the water is very brackish or contaminated with organic matter, the distillate obtained from this first stage of distillation may be potable but will have a strong or foul flavor or odor. The invention then provides a second stage of distillation in which the distillate from the first stage is redistilled and is collected in other troughs from which it can be drawn off for use as a purer distillate. The apparatus includes means for flushing salts, debris and organic waste from the still. The apparatus is provided with supplementary heating means to operate the still at hours when the sun's rays are weak or absent. Steam, gas, electric or other heating may be employed.

It is therefore one object of the invention to provide a relatively light, portable still for distilling nonpotable water by use of solar energy with supplementary heating from a locally applied external energy source.

Another object is to provide a still as described, with means for double distilling brackish or contaminated water.

For further comprehension of the invention, and of the objects and advantages thereof, reference will be had to the following description and accompanying drawings and to the appended claim in which the various novel features of the invention are more particularly set forth.

In the accompanying drawings forming a material part of this disclosure:

FIGURE 1 is a perspective view of a still or distillation device embodying the invention.

FIG. 2 is a side view of the device.

FIG. 3 is an enlarged cross sectional view taken on line 3—3 of FIG. 2.

FIG. 4 and FIG. 5 are reduced horizontal and vertical sectional views on lines 4—4 and 5—5 respectively of FIG. 3.

Referring to the drawing, there is shown in FIGS. 1–5 a distillation device including a cylindrical metal casing 10. The casing is axially horizontal and has vertical opposing ends walls 12, 14. The casing extends circumferentially about 270° and is open at the top. Upper marginal edges 16 of the side walls are bent inwardly. Removably mounted on the open top of the casing is a double convex cylindrical lens 18. Lateral edges 19 of the lens rests on lateral edges 16 and cutout edges 17 of the end walls of the casing. Handles 20 at the ends of the lens permit it to be lifted on and off the casing. The lens is preferably made of transparent plastic material, such as acrylic, epoxy or the like. The horizontal plane of the lens is perpendicular to the vertical plane of symmetry of the casing, 10. The casing is supported on legs 22 to insure free circulation of air around the device.

Removably mounted inside the casing is a generally V-shaped pan 24 having inclined side walls 25, a horizontal bottom wall 26, and vertical opposing end walls 27, 28. Upper edges of the side walls are extended to form two lateral cylindrically curved tubes 30. From the uppermost horizontal plane of the pan, the tubes 30 extend circumferentially laterally and downwardly about 300° to define elongated narrow passageways 31 between free edges 32 of the tubes and adjacent outer sides respectively of walls 25 of the pan. Two axially horizontal cylindrically curved troughs 33 are defined by bottom portions of the tubes 30. Outer sides of the tubes 30 are spaced from inner adjacent sides of the casing. Two long metal bars 34 are secured by screws 35 in horizontal coplanar position to inner diametrally opposing sides of the casing. These bars have opposing concave sides 36 defining recess which receive outer sides of the tubes 30 and thus serve to support the pan 24. The bars have a multiplicity of vertical passages 38 formed therein and extending between upper and lower horizontal sides of the bars. It will be noted that between outer convex upper portions of the cylindrical tubes 30 and adjacent concave portions of the inner side of the casing are defined two downwardly tapering passages or funnels 40.

At the bottom of wall 26 of the pan is secured a block 42 made of plastic material which is a thermal insulator or poor conductor of heat. This block is triangular in cross section with its apical edge pointing downwardly.

On the inner sides of the end walls 27, 28 of the pan are two horizontal ledges 44 which support horizontally a removable heating member 45. This member includes a refractory plate 46 in which is embedded an electrical resistance heating coil 48. The coil terminates in a short flexible cable 49 at the left end of the plate as clearly shown in FIG. 5. A plug 50 on the end of the cable is removably inserted in a socket 52 mounted in end wall 12 of the casing. Socket 52 has an operating switch button 51 for turning on and off electric power supplied to the heating member. Connected to the socket is a cable 53 to which power supply line 54 is connected. Line 54 terminates in a plug 55 which can be connected to a suitable power supply.

A second electrical heating member 60 similar to member 45 is removably mounted in a horizontal position on ledges 62 extending inwardly from end walls 12, 14 of the casing near the concave bottom of the casing. This concave bottom defines a trough 63 for collecting distillate D evaporated from nonpotable water W in pan 24. Water W is fed into the pan via an inlet pipe 64 at end wall 14. A hose or suply pipe 65 for the water to be purified may be connected to pipe 64. A drain faucet is removably fitted in a threaded hole in end wall 27 of the pan and extends outwardly of end wall 12 of the casing. The inlet faucet 66 is located at the bottom of the pan. The facuet 66 is used to control discharge of water from the pan.

A drain faucet 70 is located at end wall 14. This faucet is fitted in wall 14 near to but spaced from the lowermost point of the casing to draw distillate from trough 63. A waste drain faucet 73 is fitted in the underside of the casing bottom. Two faucets 76, 77 are mounted at end wall 14 and open into troughs 33 through registering holes in walls 28 and 14 of the pan and casing. These faucets are used to draw off double distilled water from the troughs 33 respectively.

In operation of the device, it is preferable that it be located so that its vertical plane of symmetry is located in a north-south direction. Thus sun rays will pass through the lens 18 during the time of the day when they are of maximum intensity. This is indicated by dotted lines L, L', L'' in FIG. 3 which show how the lens concentrates light rays upon the surface S of water W in pan 24 during the day. Water vapor evaporated from the surface S will impinge on the underside of the lens which serves as a cover and closure for the casing. The water vapor will not condense there because the lens is warmed by the sun and directly opposite the water surface S where it is warmed by heat radiated therefrom. However, the water vapor will impinge at the upper inner portions of the side walls of the casing around which air freely circulates. The water vapor will condense on the cooler walls of the casing and will run down these walls to the apertured bars 34. When the sun's rays are not of sufficient intensity, or to supplement the sun's rays to effect faster evaporation of water W, heating member 45 will be switched on. The condensed water vapor will run down into trough 63. The distillate D collects there and can be drawn off at will through faucet 70.

If it is found that the water tastes too brackish, heating member 60 can be turned on. This heating members has a coil 79 in plate 83 connected via a short flexible cable 80 and plug 81 to a socket 82 mounted in end wall 12 of the casing. Socket 82 is connected via short cable 85 to the power supply line 54. Socket 82 has a switch 84 by means of which the power supply to member 60 can be turned on and off.

When heating member 60 is turned on, the distillate D is evaporated and initially impinges on the triangular block 42 whose inclined walls guide the water vapor upwardly and laterally. The water vapor then contacts side walls 25 of the pan. These walls are warm because they are adjacent to the lateral sides of the heater 45 so that the water vapor does not condense there. The water vapor passes through passages 31 and there is entrapped. The outer sides of tubes 30 are cooled by conduction via the side walls of the casing and supporting bars 34 so that the water vapor condenses on the concave inner sides of the tubes 30 and collects in both troughs 33 as the distillate D'. The distillate D' can be drawn off from the troughs via individual faucets 76, 77.

Salt and waste matter which collects on the top of heating member 45 can be scraped off. This member is exposed when lens 18 is lifted off casing 10. The residue from distillation of the water W in pan 24 can be flushed out by passing a stream of sea water or brackish water into the pan through inlet 64 and out of the faucet 66 which will then be opened. If necessary at intervals, the heater member 45 can be lifted off the ledges 44 to expose the bottom of the pan which can then be manually cleaned.

At infrequent intervals the trough 63 can be cleaned by passing clean water into the trough through faucet 70 which will then be used as an inlet while permitting the water to drain out of faucet 73. The wash water of trough 63 need not be discarded since it can be collected in a suitable container and poured back into pan 24 through the open top, when lens 18 is removed, or via inlet pipe 64. At very rare intervals the trough 63 can be manually cleaned by removing pan 24 and heating member 60 to clear the entire interior of the casing for scouring and manual cleaning. The wash water can be saved and redistilled after device is reassembled.

The invention thus provides relatively simple, portable means for distilling and redistilling sea water, salt water, brackish water and contaminated water. If desired, gas heaters can be substituted for either one or both electrical heater members. Alternatively superheated steam or other hot liquid can be fed through either one or both heater members. Maximum use can be made of solar energy to economize on consumption of locally applied energy in operating the device.

While I have illustrated and described the preferred embodiments of my invention, it is to be understood that I do not limit myself to the precise constructions herein disclosed and that various changes and modifications may be made within the scope of the invention as defined in the appended claim.

What is claimed is:

Water purification apparatus, comprising an elongated metal cylindrical casing closed at the bottom and ends and being open at the top, a double convex removable cylindrical lens in said open top for passing solar rays into the casing, for heating water therein, a container in the casing, said container comprising a horizontally disposed pan having integral cylindrical side troughs for collecting condensate, means for feeding nonpotable water into said container from outside the casing, said casing having a bottom defining a trough underneath said container to collect water evaporated from the container and condensing as a distillate on interior walls of the casing, a heating member in said container for heating water therein to supplement heating of the nonpotable water by said solar rays, another heating member in said casing trough for heating and evaporating the said distillate therefrom, whereby said nonpotable water is doubly distilled, and a faucet fitted on the inside of the casing bottom to drain off the waste.

References Cited

UNITED STATES PATENTS

| | | | |
|---|---|---|---|
| 988,661 | 4/1911 | Power | 202—197 X |
| 1,302,363 | 4/1919 | Graham | 202—232 |
| 2,490,659 | 12/1949 | Snyder | 202—205 |
| 2,625,506 | 1/1953 | Baer | 202—196 |
| 2,848,389 | 8/1958 | Bjorksten | 202—234 |
| 3,257,291 | 6/1966 | Gerber | 202—234 |

FOREIGN PATENTS 916,452    1946    France.

NORMAN YUDKOFF, *Primary Examiner.*

F. DRUMMOND, *Assistant Examiner.*